United States Patent
Hiramatsu et al.

(10) Patent No.: US 6,375,260 B1
(45) Date of Patent: *Apr. 23, 2002

(54) CHILD SEAT

(75) Inventors: Koji Hiramatsu, Shiga; Toshiaki Iwasaki, Toyota; Atsushi Hiroshige, Toyota; Shunichi Katsumata, Toyota, all of (JP)

(73) Assignees: Takata Corporation, Tokyo; Toyota Motor Corporation, Toyota, both of (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/561,897

(22) Filed: May 1, 2000

(30) Foreign Application Priority Data

May 10, 1999 (JP) .............................. 11-128848
Apr. 7, 2000 (JP) ........................... 2000-106794

(51) Int. Cl.$^7$ ............................................... A47D 1/10
(52) U.S. Cl. ............................. 297/256.16; 297/250.1; 297/253
(58) Field of Search .................... 297/256.16, 253, 297/250.1

(56) References Cited

U.S. PATENT DOCUMENTS

| | | | | |
|---|---|---|---|---|
| 4,306,749 A | * | 12/1981 | Deloustal | 297/256.16 |
| 4,943,113 A | * | 7/1990 | Meeker | 297/256.16 |
| 5,385,387 A | * | 1/1995 | Kain | 297/256.16 |
| 5,431,478 A | * | 7/1995 | Noonan | 297/256.16 X |
| 5,466,044 A | * | 11/1995 | Barley et al. | 297/253 X |
| 5,487,588 A | * | 1/1996 | Burleigh et al. | 297/253 |
| 5,524,965 A | * | 6/1996 | Barley | 297/256.16 |
| 5,669,663 A | * | 9/1997 | Feuerherdt | 297/253 |
| 5,820,215 A | * | 10/1998 | Dreisbach | 297/256.16 |
| 5,890,762 A | * | 4/1999 | Yoshida | 297/256.16 X |
| 5,915,787 A | * | 6/1999 | Brookman | 297/256.16 X |
| 5,941,601 A | * | 8/1999 | Scott et al. | 297/253 |
| 5,971,479 A | | 10/1999 | Jacquemot et al. | 297/250.1 X |
| 6,082,819 A | * | 7/2000 | Jackson | 297/256.16 X |
| 6,183,044 B1 | * | 2/2001 | Koyanagi et al. | 297/256.16 |
| 6,209,957 B1 | * | 4/2001 | Baloga et al. | 297/253 |
| 6,260,920 B1 | * | 7/2001 | Tolfsen | 297/256.16 |

FOREIGN PATENT DOCUMENTS

| | | | |
|---|---|---|---|
| DE | 4137599 A1 | * 5/1993 | 297/256.16 |
| EP | 0 714 806 | 6/1996 | |
| EP | 0 952 032 | 10/1999 | |
| GB | 2 346 083 | 8/2000 | |
| JP | 7-164938 | 6/1995 | |
| JP | 7-164939 | 6/1995 | |

* cited by examiner

*Primary Examiner*—Peter M. Cuomo
*Assistant Examiner*—Rodney B. White
(74) *Attorney, Agent, or Firm*—Kanesaka & Takeuchi (57) ABSTRACT

A child seat is formed of a child seat main portion for holding a child, and a base on which the child seat main portion is detachably mounted. The base has a connecting portion to be connected to a vehicle, and a fixing device engageable with an engaging member of the child seat main portion. An engagement releasing member is installed in one of the base and the child seat main portion for releasing an engagement between the fixing device and the engaging member. In the child seat, a permission member is formed to cooperate with the connecting portion for allowing the child seat main portion to engage the base only when the base is connected to the vehicle. The child seat can be easily fixed to the vehicle.

9 Claims, 8 Drawing Sheets

CHILD SEAT

BACKGROUND OF THE INVENTION AND RELATED ART STATEMENT

The present invention relates to a child seat to be installed on a seat in a vehicle.

The child seat is formed of a seat portion on which buttocks of a child are put, and a back portion to which a back of the child leans. Generally, the seat portion and back portion are integrally formed together.

A conventional child seat has been fixed to a seat in a vehicle by a webbing of a seat belt device for an adult. In case the child seat is fixed to the seat by the webbing as described above, the webbing has to be pulled out to fix the child seat and passed through or hooked on predetermined portions. Thus, fixing of the child seat is troublesome. Also, since the child seat is bulky, it requires a great labor to carry the child seat into a cabin of the vehicle.

In European Patent Publication EP 841209A1, it is disclosed that a receiving portion formed of rods is provided on left and right sides of a seat in a car, and a child seat is detachably mounted on the receiving portion. The child seat includes two vertical members extending rearward, and distal ends of the vertical members are provided with engaging portions engaging the receiving portion. On the left and right sides of the child seat, arms are provided to rotate in the front and rear directions, and the arms abut against a seat back of the seat in the car to thereby prevent the child seat from being floated.

In EP 841209A1, since the child seat is integrally formed as a whole, its size and weight are large, so that a great labor is required for bringing the child seat in and out of the car and fixing the child seat to the seat.

In view of the above defects, the present invention has been made, and an object of the invention is to provide a child seat which can be extremely simply fixed to a seat in a vehicle.

Another object of the invention is to provide a child seat as stated above, which can be easily carried.

A further object of the invention is to provide a child seat as stated above, wherein a child seat main portion can be fixed to a base only after the base is connected to the seat in the vehicle.

Further objects and advantages of the invention will be apparent from the following description of the invention.

SUMMARY OF THE INVENTION

A child seat of the present invention includes a child seat main portion having a seat portion on which buttocks of a child are put and a back portion to which a back of the child leans, and a base on which the child seat main portion is mounted. The base is provided with a connecting portion to be connected to the vehicle, and the child seat main portion is detachably mounted on the base. In order to fix the child seat main portion to the base, the base is provided with fixing members for fixing the child seat main portion to the base, and the child seat main portion is provided with an engaging member to engage the fixing member. The base or the child seat main portion is provided with an engagement releasing member for releasing the engagement. The base is provided with a device for allowing the child seat main portion to engage the base only after the base is connected to the vehicle.

In the child seat, after the base is fixed to the vehicle, the child seat main portion can be mounted on the base. By forming the base and the child seat main portion separately as described above, the base and child seat main portion can be easily carried in or out of a cabin in the vehicle, respectively.

Also, in case the base separated from the child seat main portion is mounted on the seat, since the base is not accompanied with the child seat main portion, the fixing operation of the base can be easily carried out.

Since the child seat of the present invention is provided with a device (hereinafter referred to as "allowable device" or "permission member") for allowing the child seat main portion to be engaged with the base only when the base is securely connected to the seat in the vehicle, the child seat main portion is prevented from being connected to the base without fixing the base to the seat in the vehicle.

In the present invention, the fixing members are provided to a front portion and a back portion of the base, and the fixing member in the back portion is provided with an opening into which a flange provided at the rear portion of the child seat main portion is inserted. In an interior of the opening, an upright portion as the allowable device as mentioned above is provided to be moved vertically, and it is preferable to provide a link for allowing the flange to enter the opening by retreating, i.e. lowering, the upright portion upon a connecting operation of the base to the vehicle.

In this case, the base may be provided with arms projecting rearwards at the back side thereof. Each arm is provided with a hook at a distal end thereof for holding a clamping bar attached to the vehicle. It is preferable that the link allows the upright portion to be retreated, i.e., lowered in cooperation with the holding operation of the hooks.

It can be recognized at a glance that the upright portion is elevated, by coloring the upright portion with red or yellow color, so that the base can not be fixed, i.e. the flange can not be inserted into the opening.

Also, it may be observed with eyes by proving a letter, figure or symbol to the upright portion that the base can not be fixed, i.e. the flange can not be inserted into the opening.

DETAILED DESCRIPTION OF PREFERRED EMBODIMENTS

Figure 9:
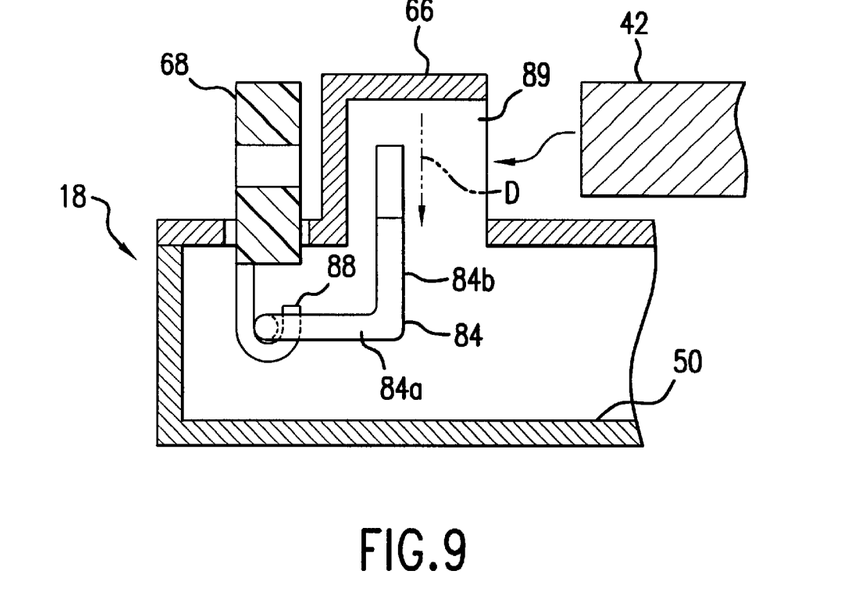
FIG. 9 is a sectional view taken along line 9—9 in FIG. 1.
Figure 10:
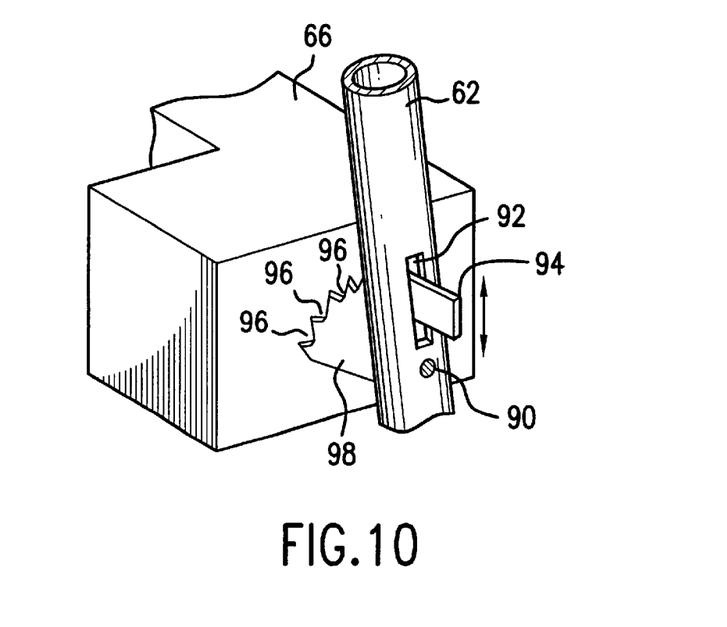
FIG. 10 is a perspective view for showing a structure of a lower part of a float stopper.
Figure 11:
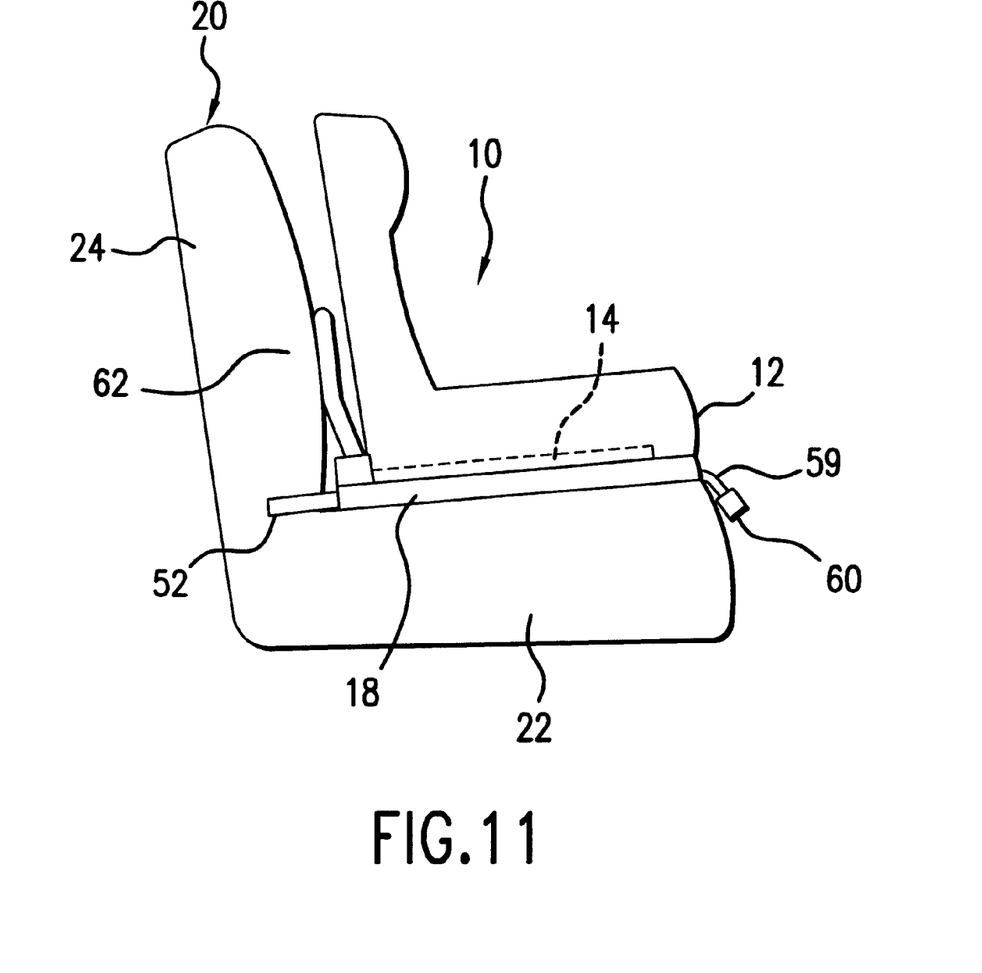
FIG. 11 is a side view in a state where the child seat of the invention is installed on a seat.

Hereunder, with reference to FIGS. 1 through 11, a first embodiment of a child seat is explained. The child seat 10 as shown in FIG. 11 is installed on a seat 20, in a vehicle, having a seat cushion or horizontal portion 22, and a seat back or back portion 24. The child seat 10 includes a child seat main portion 12, and a base 18 to which the child seat main portion is detachably fixed. To the child seat main portion 12, a bottom plate 14 for connection is integrally provided. The base 18 is mounted on the seat cushion 22 of the seat 20 in the vehicle and fixed thereto.

Figure 1:
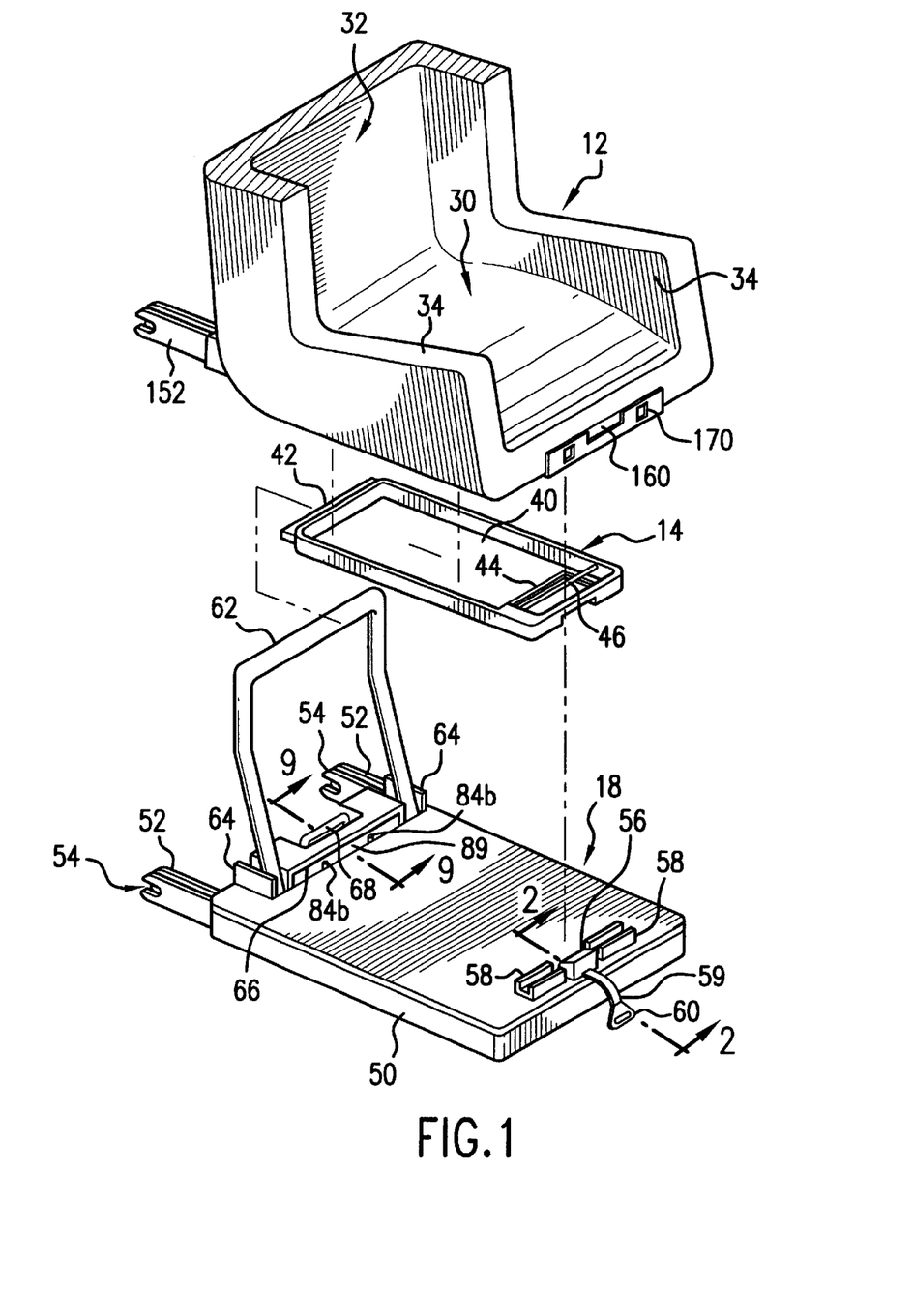
FIG. 1 is an exploded perspective view of a child seat according to an embodiment of the present invention.

The child seat main portion 12 as shown in FIG. 1 includes a seat portion 30, a back portion 32 and arm portions 34, and is integrally formed by a synthetic resin, such as urethane. It is preferable that the bottom plate 14 is integrally fixed to the bottom surface of the child seat main portion 12 through an insert molding, bolting, riveting or the like.

The bottom plate 14 includes a main plate portion 40 in a rectangular shape, a flange 42 extending from a rear side of the main plate portion 40, an opening 44 provided in a front portion of the main plate portion 40, and a bar 46 parallel to a front side of the main plate portion 40 so that the bar crosses the opening 44.

The base 18 is formed of a base main portion 50 in a rectangular shape; a pair of arms 52 extending rearward from both edges of a rear portion of the base main portion 50; holding portions 54 provided at distal edges of the arms 52; a hook 56 disposed in a front portion of the base main portion 50; bar engaging members 58; a belt 59 and an operating piece 60 for releasing an engagement of the hook 56; a float stopper 62, as a float preventing member, provided on an upper surface of the rear portion of the base main portion 50; supporting portions 64 for supporting the float stopper 62; a flange holding member 66 engaging the flange 42; an operating piece 68 for unclamping the holding portions 54; and the like.

Figure 4:
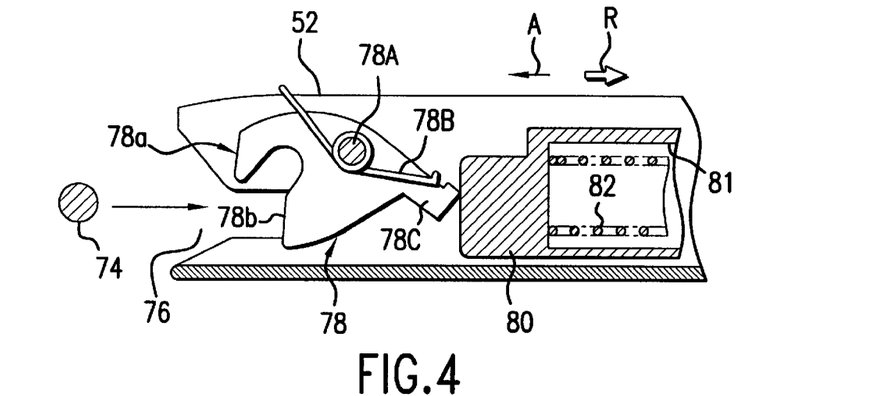
FIG. 4 is a vertical sectional view of a forward end portion of an arm.
Figure 5:
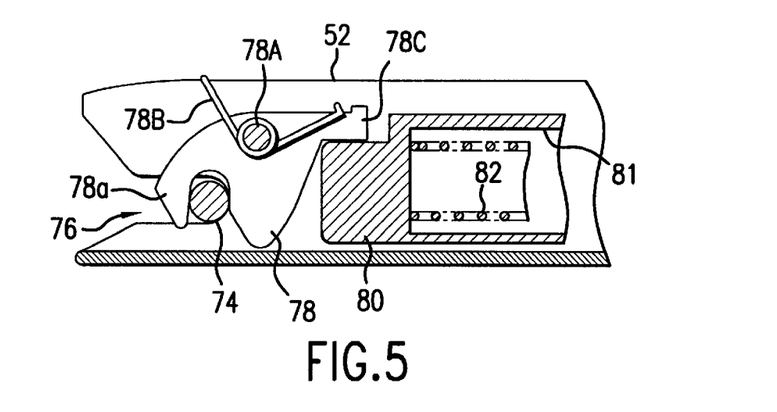
FIG. 5 is a vertical sectional view of the forward end portion of the arm.
Figure 6:
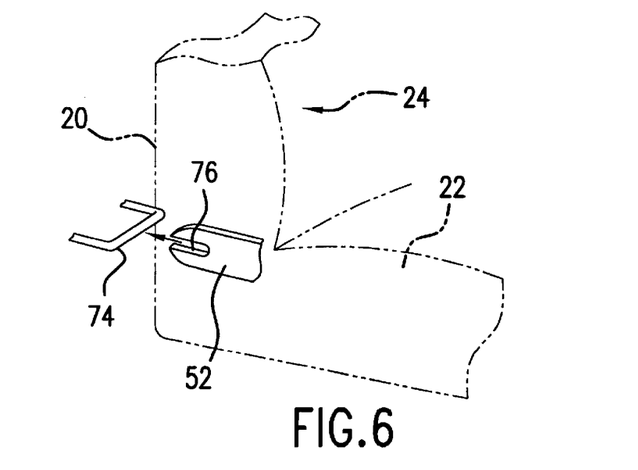
FIG. 6 is a perspective view for showing an engaging relationship between the arm and a clamping bar.
Figure 7:
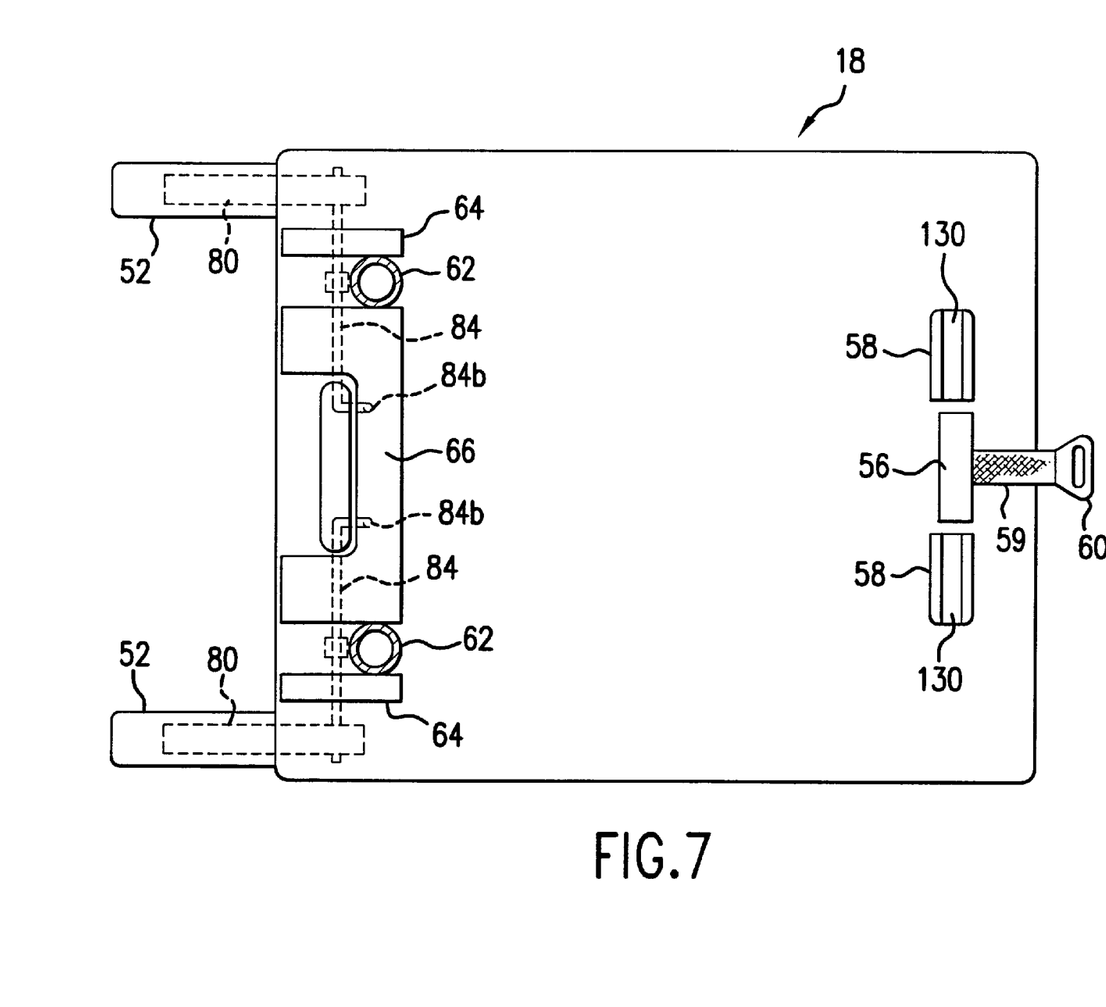
FIG. 7 is a plan view of a base.

The holding portions 54 of the arms 52, as shown in FIGS. 4 through 6, hold clamping bars 74 provided on both left and right sides of the rear portion of the seat 20 in the vehicle, respectively. The bars 74 are spaced in a widthwise direction of the vehicle. On a rear side of each arm 52, a depressed or concave portion 76 for receiving therein the bar 74, and a hook 78 for latching the clamping bar 74 entered into the depressed portion 76 are provided.

In each arm 52, a block rod 80 for preventing the hook 78 from being retreated in a direction for releasing the hook 78 is disposed. The block rod 80 is movable in a longitudinal direction of the arm 52, and is urged in a rear direction (left direction in FIGS. 4 and 5) of the base 18 by a spring 82. Incidentally, reference numeral 81 denotes a spring receiving portion of the block rod 80.

Each hook 78 is vertically rotatable around a shaft 78A, and is urged in a direction (upper direction in FIGS. 4 and 5) such that a claw portion 78a is separated from the bar 74 by a spring 78B. In case the bar 74 enters the concave portion 76, the bar 74 hits an abutting surface 78b of the hook 78, so that the bar 74 presses down the claw portion 78a of the hook 78 to further enter the concave portion 76. When the bar 74 enters further beyond the claw portion 78a, the claw portion 78a is pressed down against an urging force of the spring 78B, so that the bar 74 is held in a latched state, as shown in FIG. 5.

Incidentally, when the bar 74 enters toward the claw portion 78a, a rear portion 78c of the hook 78 is raised and a forward edge of the block rod 80 enters the underside of the rear portion 78c, as shown in FIG. 5. Thus, the hook 78 is prevented from being rotated in a hold releasing direction (clockwise direction in FIG. 5), and the bar 74 is held by the hook 78.

Figure 8:
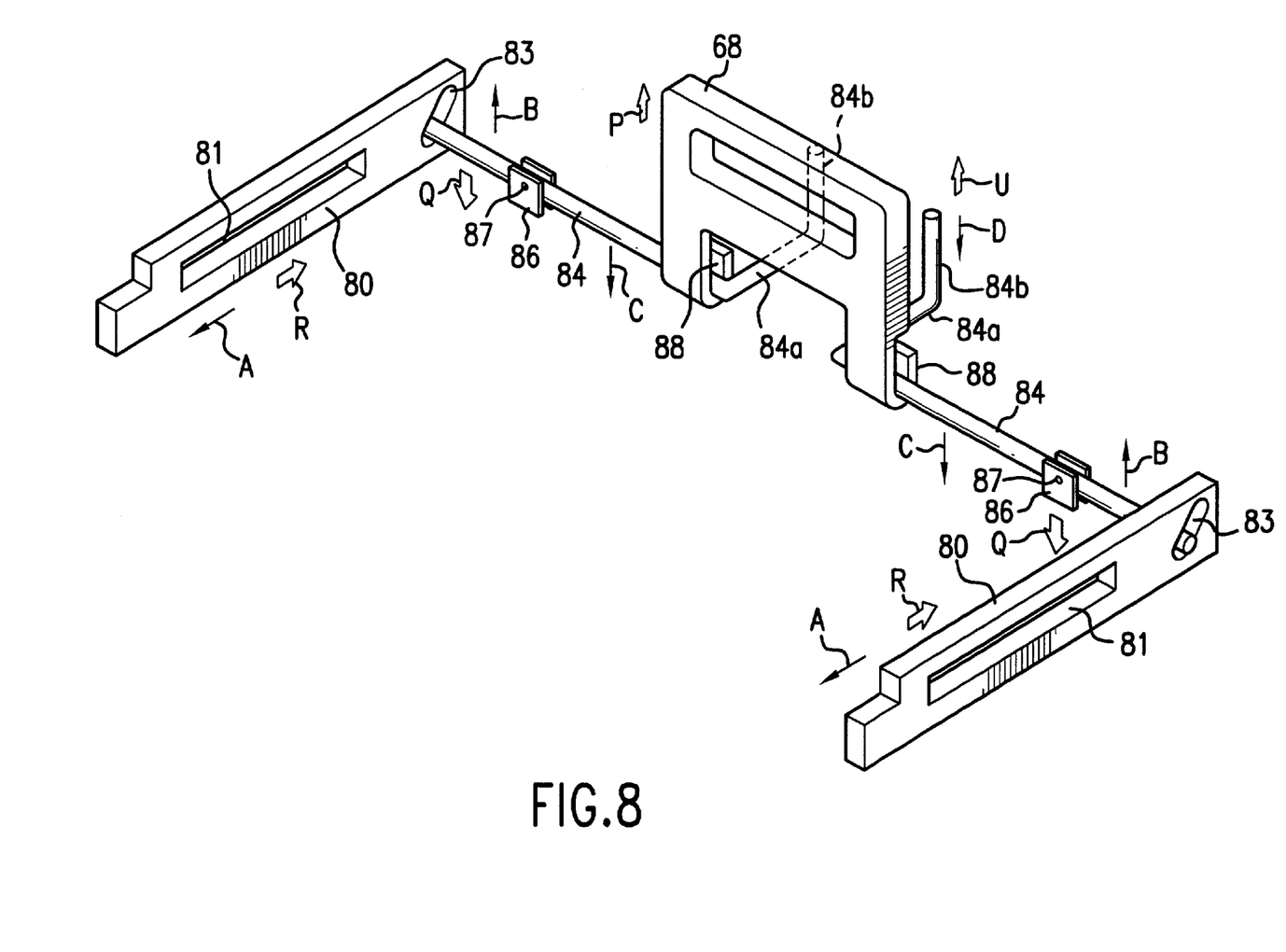
FIG. 8 is a perspective view for showing a structure of links, an operating piece and block rods.

As shown in FIG. 8, a rear end of each block rod 80 is provided with an inclined slot 83, into which one end of each link 84 is inserted. The link 84 has a rod shape, and extends toward a center in a widthwise direction of the base 18. A middle portion of each link 84 is swingably supported at a supporting member 86 disposed on the base main portion 50 by a shaft 87.

The other end of the link 84 is engaged with a hook portion 88 of the operating piece 68. The hook portion 88 has a J-character shape, and the link 84 is inserted into the hook portion 88.

The link 84 includes a horizontal portion 84a extending to a front side of the base 18 from the operating piece 68, and an upright portion 84b extending upwardly from the horizontal portion 84a. As shown in FIGS. 1 and 9, the upright portion 84b enters the flange holding member 66.

The flange holding member 66 projects upward from an upper surface of the base 18, and a front side thereof is provided with an opening 89 for receiving therein the flange 42 of the connecting bottom plate 14.

As shown in FIG. 9, in case the operating piece 68 is positioned at an upper limit, the upright portion 84b of the link 84 is also positioned at an upper limit to thereby face the opening 89. In this state, the flange 42 is prevented from being entered into an inner portion of the opening 89 by the upright portion 84b. Incidentally, the upright portion 84b is colored with a distinct color, such as red, yellow or the like, or provided with a resin cap of the bright color.

As shown in FIG. 5, in case the hook 78 holds the clamping bar 74 and the block rod 80 moves forward (in an arrow A direction in FIG. 8), one end of the link 84 is elevated in an arrow B direction in FIG. 8 (upper direction) guided by the slot 83 to thereby move the portions 84a, 84b of the link 84 downward, as shown by arrows C, D. Following the downward movements, the operating piece 68 is also pressed down.

Under the above-stated condition, since the upright portion 84b is retreated downward from an inside of the flange holding member 66, the flange 42 can enter the opening 89.

The bottom plate 14 can be fixed to the base 18 by inserting the flange 42 into the opening 89 and allowing the bar 46 to engage the bar engaging members 58. Since the bottom plate 14 is integrally formed with the child seat main portion 12, the child seat main portion 12 is also fixed to the base 18.

In order to separate the base 18 from the clamping bar 74, the operating piece 68 is raised as shown by an arrow P in FIG. 8. Then, the links 84 are rotated in arrow Q directions and the end portions of the links 84 are moved in the slots 83 to thereby retreat the block rods 80 in arrow R directions. Thus, the block rods 80 are separated from the rear portions 78c of the hooks 78, as shown in FIG. 4, and the hooks 78 are rotated in clockwise directions by urging forces of the springs 78B, so that the hooks 78 return to a state as shown in FIG. 4 from a state as shown in FIG. 5. In the state as shown in FIG. 4, since the claw portions 78a are elevated, the clamping bars 74 can be separated from the arms 52.

In case the child seat main portion 12 is installed on the base 18 fixed to the seat 20, after the flange 42 of the bottom plate 14 is inserted into the underside of the flange holding member 66, a front side of the child seat main portion 12 is pressed downward, and the bar 46 is connected to the base 18 through the bar engaging members 58 and the hook 56.

Figure 2:
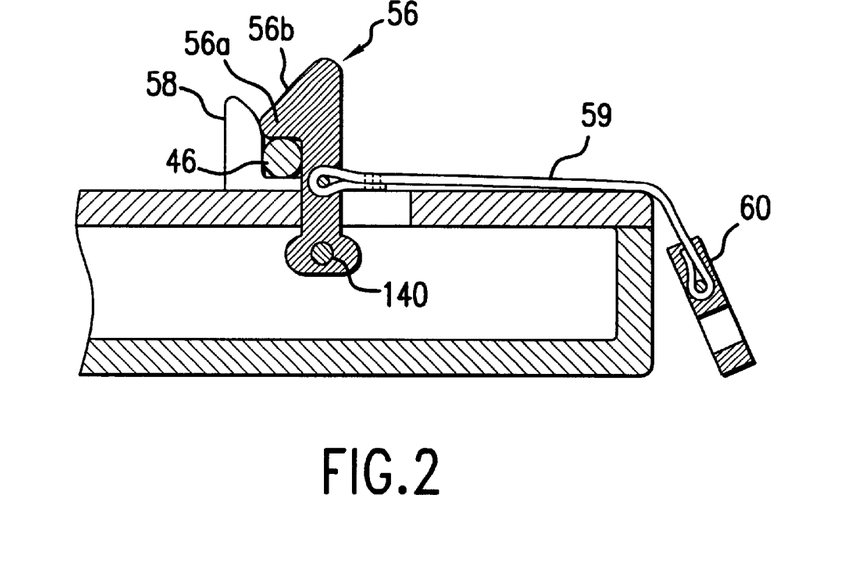
FIG. 2 is a sectional view taken along line 2—2 in FIG. 1.
Figure 3:
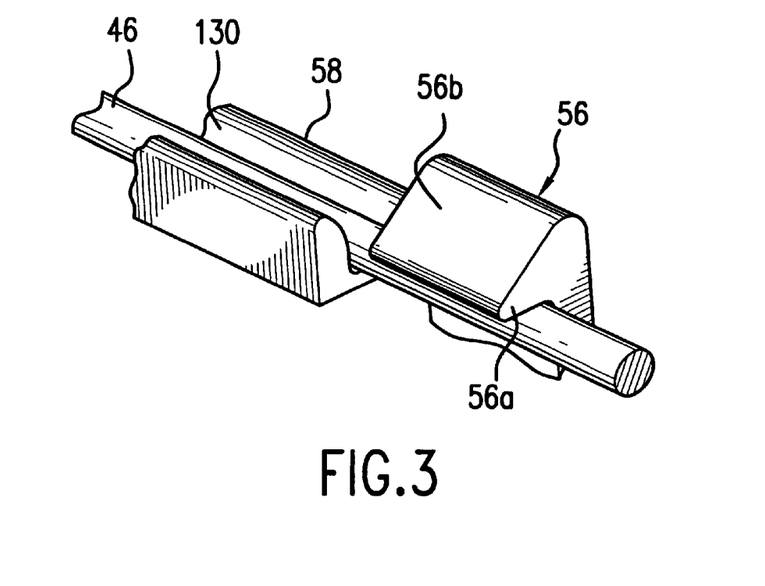
FIG. 3 is a partial perspective view of a hook and a bar engaging member.

The bar engaging members 58, as shown with enlarged views in FIGS. 2 and 3, are formed of rail-like members extending in the left and right directions of the base 18, and fixed to the base 18 by screws or the like. An upper surface of each bar engaging member 58 is provided with a groove 130, into which the bar 46 is inserted in a longitudinal direction thereof.

The hook 56 is disposed between the bar engaging members 58. The hook 56, as shown in FIG. 2, is rotatably supported to the base 18 by a supporting shaft 140, and is urged in a counter clockwise direction in FIG. 2 by a spring (not shown). An upper surface of the claw portion 56a of the hook 56 includes an inclined surface 56b with a falling gradient toward the rear side of the base 18.

When the bar 46 of the bottom plate 14 is pressed against the inclined surface 56b from an upper side, the hook 56 retreats to a right side in FIGS. 2 and 3, and the bar 46 enters the grooves 130. When the bar 46 passes through the claw portion 56a, the hook 56 advances to the left side in FIGS. 2 and 3 by a pressing force of the spring, and the claw portion 56a covers the bar 46 to thereby fix the bottom plate 14 together with the child seat main portion 12 to the base 18.

In order to release the fixed state, the operating piece 60 is pulled to retreat the hook 56 in the right side in FIGS. 2 and 3, and then the child seat main portion 12 is pulled upward.

After the arms 52 of the base 18 are connected to the clamping bars 74, the float stopper 62 is turned to the rear side so that the base 18 can be fixed onto the seat cushion 22, not to float upwardly.

The float stopper 62, as shown in FIGS. 1 and 10, is rotatably supported between the flange holding member 66 and the respective supporting portions 64 by the supporting shafts 90.

The float stopper 62 is provided with a pair of long slots 92 in a vertical direction, and an engaging plate 94 is inserted into each of the long slots 92 to be vertically moved. The engaging plate 94 is urged upward by a spring (not shown) disposed inside the float stopper 62.

The flange holding member 66 and each supporting member 64 are provided with fan-shape openings 98 having sawtooth-shape portions 96 on their peripheries, respectively.

The engaging plate 94 engages the sawtooth portions 96. Although the sawtooth portions 96 allow the engaging plate 94 to move in the left direction in FIG. 10, i.e. the float stopper 62 is rotated to the rear side of the base 18, the engaging plate 94 prevents the float stopper 62 from moving in the right direction in FIG. 10. Therefore, after the base 18 is connected to the clamping bars 74 by the arms 52, the float stopper 62 is rotated to the rear side to press against the seat back 24, so that the base 18 is fixed to the seat 20. After the fixture, the base 18 does not float therefrom.

The child seat main portion 12 is connected to the base 18 fixed to the seat 20 as explained above. In order to carry out this connection, as described above, the flange 42 is inserted into the opening 89, and the bar 46 is engaged with the hook 56 and the bar engaging members 58.

Incidentally, in a state where the arms 52 of the base 18 are connected to the clamping bars 74, the upright portion 84b of each link 84 is located to the lower side in FIG. 9 (in an arrow D direction), so that the flange 42 enters into a deep inside of the opening 89 to thereby connect the child seat main portion 12 to the base 18. Also, when the upright portion 84b is positioned on the lower side, since the upright portion 84b with the distinct color, such as red, can not be observed with eyes in the opening 89, it is confirmed that the child seat main portion 12 can be connected to the base 18. On the other hand, in case the upright portion 84b is observed in the opening 89, it is recognized that the base 18 is not connected to the clamping bar 74.

As described hereinabove, in the child seat 10, since the child seat main portion 12 and the base 18 are formed separately, the child seat main portion 12 and the base 18 can be brought into the vehicle separately and mounted therein separately. In case the fixing operation of the base 18 is carried out, since the child seat main portion 12 is separated therefrom, the connecting operation between the holding portions 54 of the arms 52 and the clamping bars 74 can be carried out easily.

In order to fix the base 18, after the arms 52 and the clamping bars 74 are engaged with each other, the float stopper 62 can only be pushed rearward. Thus, fixing of the base 18 is carried out extremely simply and fixing strength of the base 18 is also extremely high. In case the child seat main portion 12 is fixed to the base 18, the flange 42 is inserted into the underside of the flange holding member 66, and then, the front side of the child seat main portion 12 is pressed downward. Thus, the fixing can be done simply. Moreover, the connection between the child seat main portion 12 and the base 18 is extremely strong.

Incidentally, in the present embodiment, a rear surface of the child seat main portion 12 is provided with arms 152 similar to the arms 52, so that the child seat main portion 12 can be directly attached to the seat 20 without the base 18.

In the present embodiment, the bar 46 is provided at the bottom plate 14 constituting a part of the child seat main portion 12, and the hook 56 and the operating piece 60 are disposed on the base 18, but the bar 46 may be provided at the base 18, and the hook 56 and operating piece 60 may be located to the child seat main portion 12 (for example, connecting bottom plate 14).

Figure 12:
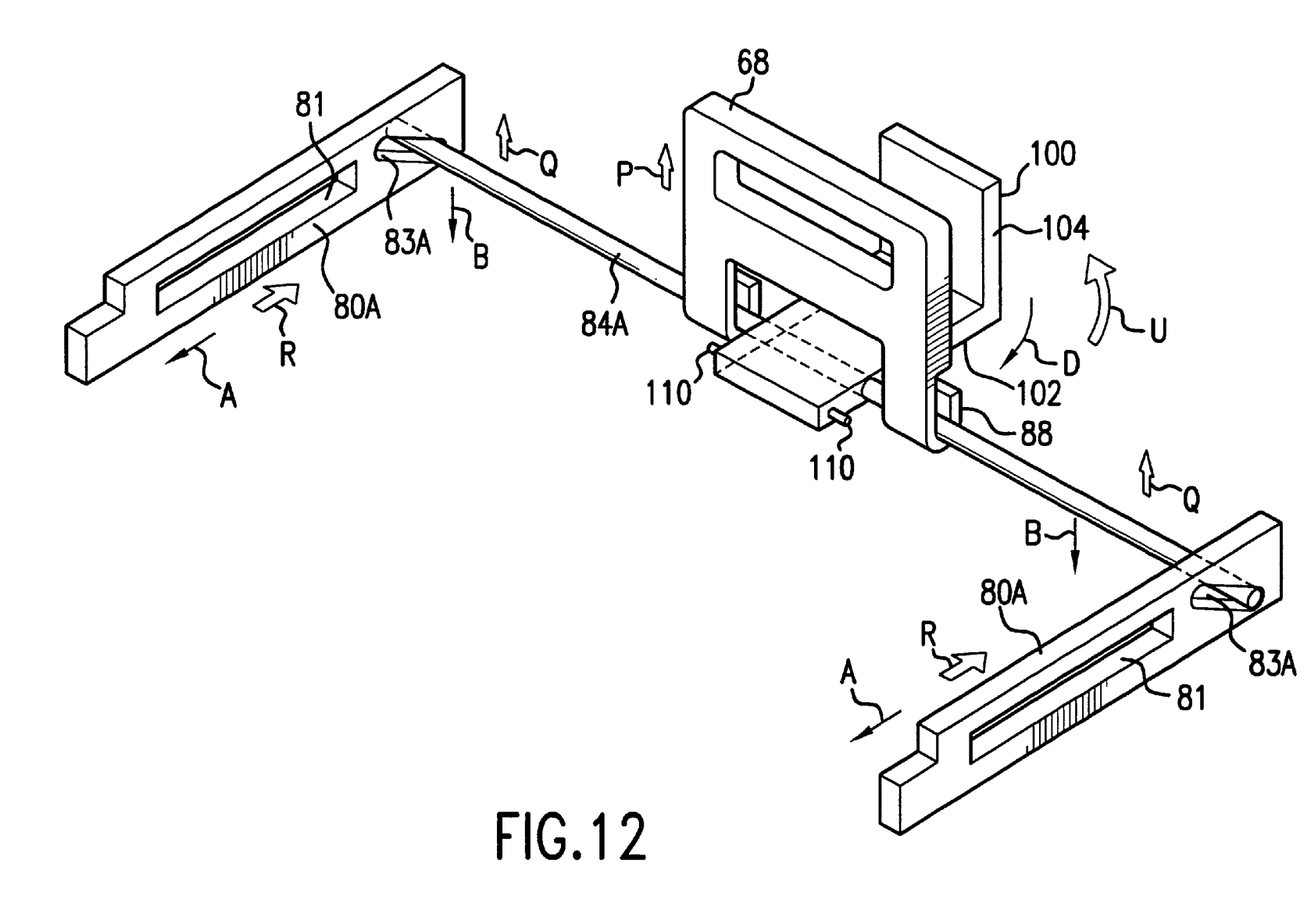
FIG. 12 is a perspective view for showing another structure of a link, an operating piece and block rods.

FIG. 12 is a perspective view showing a second embodiment, wherein a link 84A is used, similar to FIG. 8.

In the present embodiment, rear portions of block rods 80A are provided with slots 83A inclined in a direction opposite to that of the slots 83, respectively. A link 84A extends between a pair of the block rods 80A, and both ends of the link 84A are inserted into the slots 83A, respectively. The middle portion of the link 84A is engaged with the hook portions 88 of the operating piece 68. Also, the middle portion of the link 84A is inserted into an L-shape block 100. The L-shape block 100 includes a horizontal portion 102 and an upright portion 104, and a rear end of the horizontal portion 102 is rotatably supported to the base main portion 50 through supporting shafts 110.

In the state where the base 18 is not connected to the clamping bars 74, the block rods 80A are retreated in arrow R directions. Also, the link 84A is elevated in arrow Q directions; the operating piece 68 is also elevated; the L-shape block 100 is rotated upward in an arrow U direction; and the upright portion 104 is elevated in the flange holding member 66. As a result, the flange 42 can not be deeply inserted into the flange holding member 66.

In the state where the base 18 is connected to the clamping bars 74, the block rods 80A become a state as shown in FIG. 5, where the block rods 80A advance in arrow A directions. The link 84A is lowered in arrow B directions; the operating piece 68 is lowered; and the L-shape block 100 is rotated while lowering in an arrow D direction. Thus, the upright portion 104 is retreated downward in the flange holding member 66, so that the flange 42 can be deeply inserted into the flange holding member 66. In case the upright portion 104 of the L-shape block 100 is also coated or colored by a distinct color, such as red and yellow, success or failure of engagements between the arms 52 and the clamping bars 74 can be confirmed through an eye observation.

When the operating piece 68 is elevated in an arrow P direction, the link 84A is elevated in the arrow Q directions, and the block rods 80A are retreated in the arrow R directions, so that the hooks 78 become the state as shown in FIG. 4. Thus, the arms 52 of the base 18 can be separated from the clamping bars 74, respectively.

Instead of coating or coloring the upright portion 104 of the L-shape block 100, or in addition to the coating or coloring, letters, figures or symbols may be provided to the upright portion 104 so that it can be easily confirmed, through an eye observation, whether the flange 42 can be inserted or not into the flange holding member 66; or whether engagements between the arms 52 and the clamping bars 74 can be made or not.

Also, in regard to the upright portions 84b of the links 84, whether the flange 42 can be inserted into the flange holding member 66, or whether engagements between the arms 52 and the clamping bars 74 can be done, may be confirmed through the eye observation by providing the upright portions 84b of the links 84 with caps or plates coated or colored; or with letters, figures or symbols. In this case, also, only coating or coloring may be applied, or only letters, figures or symbols may be provided. Or, both coating or coloring and letters, figures or symbols may be applied.

Instead of attaching the cap or plate, the upright portions 84b may be formed in a shape of a block or plate.

As described hereinabove, in the child seat of the present invention, since the child seat main portion and the base are separately formed, it is easy to bring them into the vehicle, separately.

In case the fixing operation of the base is carried out, since the child seat main portion is separated therefrom, the operation can be done easily.

The base can be prevented from being floated by the float stopper or stopping member. Thus, the operation for fixing the child seat main portion to the base can also be extremely easily carried out.

In the child seat of the present invention, the child seat main portion can not be mounted on the base before the base is connected to the seat in the vehicle, i.e. the child seat main portion can be mounted on the base only after the base is securely fixed to the vehicle.

While the invention has been explained with reference to the specific embodiments of the invention, the explanation is illustrative and the invention is limited only by the appended claims.

What is claimed is:

1. A child seat comprising,
   a child seat main portion for holding a child, said child seat main portion having an engaging member,
   a base on which said child seat main portion is detachably mounted, said base having a connecting portion to be connected to a vehicle, and a fixing device engageable with the engaging member of the child seat main portion,
   an engagement releasing member installed in one of the base and the child seat main portion for releasing an engagement between the fixing device and the engaging member, and
   a permission member cooperating with the connecting portion for allowing the child seat main portion to engage the base only when the connecting portion is in a latched state.

2. A child seat according to claim 1, wherein said permission member includes an upright portion vertically movably provided in the base, and a link connected between the upright portion and the connecting portion.

3. A child seat according to claim 2, wherein said child seat main portion includes a flange at a rear portion, and said fixing device includes front and rear fixing members disposed at front and rear portions of the base, said rear fixing member having an opening for receiving therein the flange of the child seat main portion, said upright portion being disposed in the opening for allowing the flange to enter the opening by retreat thereof in the latched state.

4. A child seat according to claim 3, wherein said connecting portion includes a pair of arms projecting rearwardly from the base, and hooks formed at distal ends of the respective arms for holding clamping bars of the vehicle, said hooks cooperating with the links for allowing the upright portion to retreat upon engagement of the hooks.

5. A child seat according to claim 4, wherein said upright portion includes an upper portion with a color different from that of the upright portion.

6. A child seat according to claim 4, wherein said upright portion includes an upper portion with a mark selected from a group consisting of a letter, figure and symbol.

7. A child seat according to claim 1, further comprising a float stopper rotatably attached to the base for pushing a back seat of the vehicle to allow the base to be placed on a horizontal seat of the vehicle.

8. A child seat according to claim 7, wherein said float stopper includes a frame portion having at least one slot, an opening with teeth formed in the base, and an engaging plate movably located in the slot and the opening, said engaging plate being urged in the slot toward the teeth in the opening so that the engaging plate engages the teeth to keep the base on the horizontal seat.

9. A child seat according to claim 1, wherein said connecting portion has the latched state and an unlatched state with respect to the vehicle to be attached.

* * * * *